United States Patent [19]
Marsetti

[11] Patent Number: 6,073,753
[45] Date of Patent: Jun. 13, 2000

[54] ROLLER SLIDE DEVICE

[75] Inventor: Sergio Marsetti, Castelli Calepio, Italy

[73] Assignee: System Plast S.n.c. di Marsetti & C. Stampaggio Tecnopolimeri, Telgate, Italy

[21] Appl. No.: 09/118,708

[22] Filed: Jul. 17, 1998

[30] Foreign Application Priority Data

Aug. 1, 1997 [IT] Italy ................................. MI970589 U

[51] Int. Cl.[7] ................................................... B65G 13/02
[52] U.S. Cl. ........................................ 198/786; 198/836.3
[58] Field of Search ................................ 198/850, 844.1, 198/454, 785, 786, 790, 836.1, 836.3

[56] References Cited

U.S. PATENT DOCUMENTS

| 3,934,706 | 1/1976 | Tice | 198/32 |
| 4,962,843 | 10/1990 | Ouellette | 198/453 |

FOREIGN PATENT DOCUMENTS 0787666  8/1997  European Pat. Off. .

*Primary Examiner*—Kenneth W. Noland
*Attorney, Agent, or Firm*—Steinberg, Raskin & Liberchuk, P.C.

[57] ABSTRACT

A roller slide device for products in general, in particular for forming lateral guide walls in accumulation stations in transport lines, of the type comprising two section bars (1), each presenting in opposing faces (1A) a plurality of seats (2) for housing the ends of the pins (3) of idle rollers (4) arranged to make contact with the products, a stiffening element (5A, B), and means (11, 13; 10) for connection to an external support structure. The section bars comprise a seat (3B) for the removable connection of the stiffening element (5A, B) which is of substantially flat form. Means (6) are provided to rigidly connect the section bars (1) together independently of the stiffening element. The section bars (1) or said stiffening element (5A, B) are shaped in such a manner as to enable the connection means (11; 10) to be secured to the lateral surface (1C) of the section bars (1) or to the stiffening element.

6 Claims, 1 Drawing Sheet

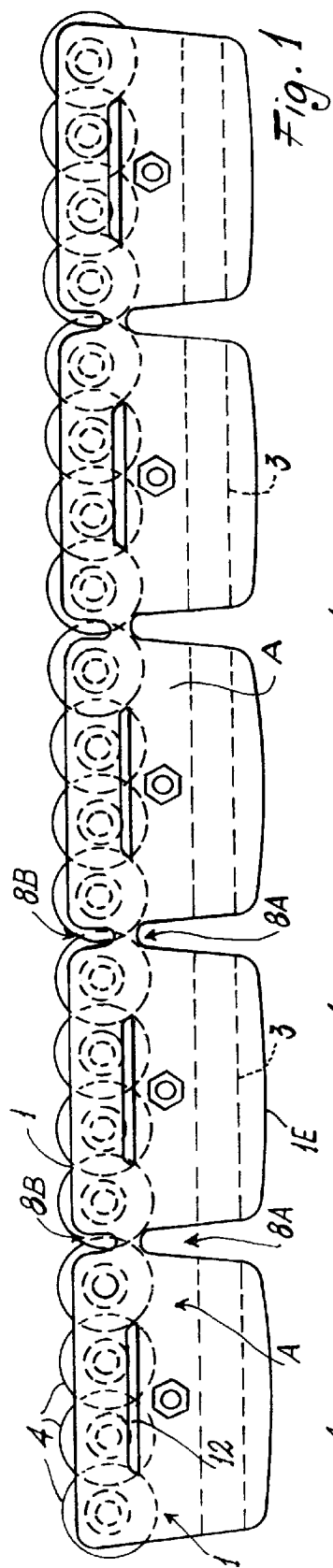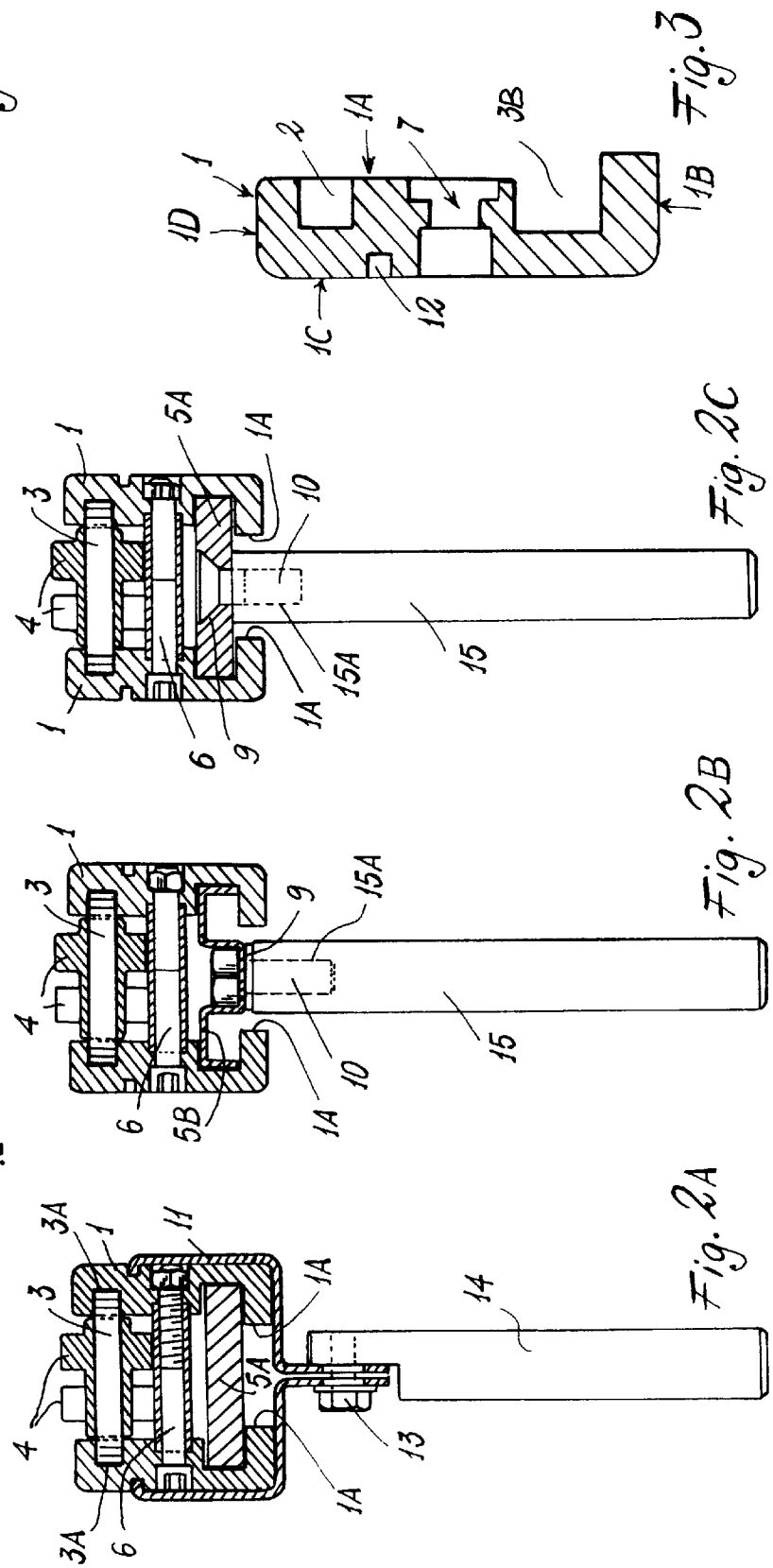

ROLLER SLIDE DEVICE

FIELD OF THE INVENTION

1. Background of the Invention

This invention relates to a device in accordance with the pre-characterising part of the main claim.

For known devices of the aforesaid type, a U-shaped channel is usually used as the stiffening element, to which a plurality of such devices are connected to form a side wall of the desired length.

In known devices the section bars carrying the roller are fixed by screws to the parallel sides of the channel, this being a relatively lengthy and difficult operation.

In addition, to form curved walls the stiffening element has to be bent, this being an operation requiring extreme care and the application of a considerable force using U-shaped channels. As the devices are used in industrial sectors which can differ considerably from each other, the support structures to which the device connection means are fixed can also differ considerably according to the application. There is therefore a requirement for devices which can be fixed to the support structure in different ways. For this purpose it is known to use pairs of brackets which engage the outer edge of the section bars and the base of the U-shaped channel. This arrangement is not however totally satisfactory both because the brackets engage against the outer edge of the section bars and because of the presence of the U-shaped channel.

OBJECTS AND SUMMARY OF THE INVENTION

An object of the invention is to provide a slide device which is of similar construction and is more easily connectable to the stiffening element.

A further object is to provide a device which enables a plurality of means to be used for its connection to the support structures.

BRIEF DESCRIPTION OF THE DRAWINGS

These and other objects which will be apparent to an expert of the art are attained by a device in accordance with the characterising part of the accompanying claims.

The invention will be more apparent from the accompanying drawings, which are provided by way of non-limiting example and on which:

DETAILED DESCRIPTION OF THE PREFERRED EMBODIMENTS

FIG. 1 is a view from above of a device according to the invention;

FIGS. 2A–C are three cross-sections through three different embodiments of the devices;

FIG. 3 is an enlarged cross-sectional through a component thereof.

With reference to said figures, a device of the invention comprises two section bars 1, the opposing faces 1A of which comprise twenty seats 2 for housing the ends 3A of pins 3 of rollers 4, a seat 3B for housing a stiffening element 5A, 5B, and a seat 7 or the passage of a screw 6 for connecting the two section bars 1 together.

In both their major edges 1E (FIG. 1) the two section bars comprise four recesses 8A, 8B (FIG. 1), those in the edge comprising the rollers being of different size than those in the other edge. In this manner, by virtue of the plastic material with which the section bars are constructed and which is at least partially flexible, the parts A can be at least partially moved angularly one relative to another so that the device can be used both for rectilinear side walls and for curvilinear side walls. In this respect, even if the stiffening element 5A, 5B is curved, the device of the invention can still be mounted on this curved element, by virtue of the recesses 8A, 8B.

The stiffening element 5A can be a simple flat bar as shown in FIG. 2A, provided with holes 9 for the passage of screws 10 (FIG. 2C), or a substantially flat M-shaped section containing holes for the passage of screws 10. The device can be connected to support structures (nor shown) using either a pair of brackets 11 or the screws 10.

The brackets 11 have a free edge engaging in seats 12 (FIG. 1) provided along the outer lateral surfaces (1C) of the section bars 1 and are shaped to adhere to the lateral base walls 1B of the section bars 1 (FIG. 3).

The brackets 11 are secured to the end of usual fixing pins 14 by a screw 13.

It should be noted that advantageously, because of the presence of the lateral seats 12, the brackets no longer need to be secured to the outer edges 1D (FIG. 3) of the section bars, as is usual in known devices. Moreover the brackets are no longer in contact with the stiffening element, as in known devices, so that this element can be slid even with the brackets mounted. In addition, because of the presence of well defined seats 12 into which is insert the brackets, it is easier to apply them in the correct position.

As an alternative to fixing the devices to the support structure by brackets, the screws 10 and pins 15 with a threaded head 15A can be used.

The device user therefore has available two different methods for connecting the device to its support structure, together with different stiffening elements provided that these are able to be housed in the seats 3B of the section bars.

The devices of the invention are assembled by inserting the rollers 4 into the relative seats 2 in the section bars 1 and then connecting the section bars 1 together. These devices are then slid along the stiffening elements, which can be rectilinear or suitably curved according to customer requirements. In this manner the device has its rollers firmly secured to the section bars even when the stiffening element is absent.

What is claimed is:

1. A roller slide device for products in general, in particular for forming lateral guide walls in accumulation stations in transport lines, of the type comprising two section bars each presenting in opposing faces a plurality of seats for housing the ends of the pins of idle rollers arranged to make contact with the products, a stiffening element, and means for connection to an external support structure for the device, said device being divided into a plurality of parts (A) which are rigidly connected together but are at least partially movable angularly one relative to another, characterised in that the section bars comprise a seat (3B) for removably housing the stiffening element (5A, B), said stiffening element (5A, B) being of substantially flat form, means (6) being provided to rigidly connect the section bars (1) together independently of the stiffening element, and said section bars (1) or said stiffening element (5A, B) being shaped in such a manner as to enable the connection means (11; 10) to be secured to the lateral surface (1C) of the section bars (1) or to the stiffening element.

2. A device as claimed in claim 1, characterised in that the connection means comprise a pair of brackets (11) which engage in a seat (12) provided in the outer lateral surface (1C) of the section bars, and are arranged to make contact only with said section bars, but not with the stiffening element.

3. A device as claimed in claim 3, characterised in that each section bars (1) comprises in each of its parts (A) a seat (12) for the connection of the brackets (11).

4. A device as claimed in claim 1, characterised in that the connection means comprise screws (10) passing through holes (9) provided in the stiffening elements, to engage in threaded holes (15A) in support pins (15).

5. A device as claimed in claim 1, characterised in that the section bars comprise in both the major edges (1E) of the lateral surface (1C) a plurality of recesses (8A, 8B) defining the various parts (A) of the section bar, the recesses present in that edge free of rollers being of greater size than the others.

6. A device as claimed in claim 1, characterised in that connection means for the section bars (1) comprise a screw (6) housed in and passing through a seat (7) provided in said section bars.

* * * * *